3,394,095
ETHYLENE/VINYL ACETATE, WAX, CHLORINATED DIPHENYL COMPOSITION
Cyril S. Treacy, Scarsdale, N.Y., assignor to M. Argueso & Co., Inc., Mamaroneck, N.Y., a corporation of New York
No Drawing. Filed July 1, 1966, Ser. No. 562,114
4 Claims. (Cl. 260—28.5)

This invention relates to a compound which is water insoluble and which is particularly useful in conjunction with the machining of thin walled articles where the walls or portions thereof must be rigidly held during a machining operation.

In the prior art, a problem has been presented in the holding of parts or articles requiring machining, such as cutting, grinding, routing, and the like, particularly when the walls thereof are relatively thin. The machining thereof may result in chattering, which has undesirable effects on the finished article. This becomes particularly of importance where automatically operated machine tools, such as those controlled by tape or similar means, are used. In the accurate machining of parts, they must be held tightly and there must not be a displacement of the walls thereof during the machining operation.

One of the principal objects of this invention is to provide a compound for rigidly holding objects to be machined in a manner that will result in rigidly holding for accurate machining and yet which will permit removal without damage thereto.

Another of the objects of this invention is to provide a compound for rigidly holding objects in a machine whereby a greater adhesion between the metal and holder is obtained than hitherto found possible.

One example of the use of the compound of the present invention is where the object or article to be machined is embedded therein and held on an operating table or support of the machine. The machining operations then can be performed upon the article without damage thereto. After the machining operations, the article can be removed from the table by subjecting the same to heat or a suitable solvent for removing all traces of the compound from the article.

It has been found that admixtures can be used of 4.8% by weight to 6.3% by weight of a natural wax such as carnauba, ouricury or candelilla, from 2.2% to 4.7% by weight of high molecular weight ethylene vinyl acetate copolymers such as sold under the trademark "Elvax 250" by Du Pont, 3.2% to 4.2% by weight of hydrogenated glycerides such as sold under the trademark "T-57-N" by Archer Daniels Midland Company, 29% to 39% by weight of chlorinated diphenyl such as sold under the trademark "Aroclor 5460" by Monsanto, and 51% to 58% by weight of a filler. The total, of course, should be 100%. Preferably, the filler can comprise 38% to 42% by weight of calcium carbonate and from 20% to 9% by weight of glass fiber.

It can be theorized that the wax serves as a hardening agent and cold flow suppressant. The chlorinated diphenyl is a resin having high adhesive properties when blended with hydrogenated glyceride. "Elvax 250" when admixed in the compound does not raise the melting point appreciably.

EXAMPLE I

|  | Parts by weight | Percent by weight |
|---|---|---|
| Carnauba Wax | 5.50 | 5.83 |
| Aroclor 5460 | 34.00 | 35.70 |
| T-57-N | 3.70 | 3.89 |
| Elvax 250 | 3.00 | 3.13 |
| Calcium Carbonate | 40.00 | 42.00 |
| Glass Fiber | 9.00 | 9.45 |
|  | 95.20 | 100 |

Melt the carnauba wax, T-57-N and Aroclor and raise temperature to 135° C., stirring well while melting. Add calcium carbonate while stirring and maintaining temperature at 135° C. Add glass fiber while stirring at 135° C. Add Elvax 250 at 135° C. while stirring. Pour as cold as possible into cold pans. The melting point will be 77° C. There is no flash point or fire point up to 315° C. A slight discoloration at 226° C. and some frothing and bubbling at 237° C. which increases by 315° C. The specific gravity was 1.85 or .066 per cubic inch.

EXAMPLE II

|  | Parts by weight | Percent by weight |
|---|---|---|
| Carnauba Wax | 5.50 | 4.80 |
| Aroclor 5460 | 34.00 | 29.70 |
| T-57-N | 3.70 | 3.20 |
| Elvax 250 | 5.00 | 4.30 |
| Calcium Carbonate | 45.00 | 39.00 |
| Glass Fiber | 21.80 | 19.00 |
|  | 115.00 | 100 |

EXAMPLE III

|  | Parts by weight | Percent by weight |
|---|---|---|
| Carnauba Wax | 5.50 | 5.30 |
| Aroclor 5460 | 34.00 | 32.40 |
| T-57-N | 3.70 | 3.50 |
| Elvax 250 | 5.00 | 4.80 |
| Calcium Carbonate | 40.00 | 38.00 |
| Glass Fiber | 16.80 | 16.00 |
|  | 105.00 | 100 |

EXAMPLE IV

|  | Parts by weight | Percent by weight |
|---|---|---|
| Carnauba Wax | 5.50 | 5.80 |
| Aroclor 5460 | 34.00 | 36.00 |
| T-57-N | 3.70 | 3.70 |
| Elvax 250 | 3.00 | 3.10 |
| Calcium Carbonate | 40.00 | 42.00 |
| Glass Fiber | 9.00 | 9.40 |
|  | 95.20 | 100 |

EXAMPLE V

|  | Parts by weight | Percent by weight |
|---|---|---|
| Carnauba Wax | 5.50 | 5.50 |
| Aroclor 5460 | 34.00 | 34.00 |
| T-57-N | 3.70 | 3.70 |
| Elvax 250 | 3.00 | 3.00 |
| Calcium Carbonate | 38.30 | 38.30 |
| Glass Fiber | 8.00 | 8.00 |
| Aluminum Powder | 5.00 | 5.00 |
| Aluminum Flake | 2.50 | 2.50 |
|  | 100.00 | 100 |

EXAMPLE VI

|  | Parts by weight | Percent by weight |
|---|---|---|
| Carnauba Wax | 5.50 | 6.30 |
| Aroclor 5460 | 34.00 | 39.00 |
| T-57-N | 3.70 | 4.25 |
| Elvax 250 | 2.00 | 2.29 |
| Calcium Carbonate | 35.00 | 40.13 |
| Glass Fiber | 7.00 | 8.03 |
|  | 87.20 | 100 |

.05% Oil Green A 1839 can be added to color.

EXAMPLE VII

|  | Parts by weight | Percent by weight |
|---|---|---|
| Carnauba Wax | 6.30 | 6.30 |
| Aroclor 5460 | 39.00 | 39.00 |
| T-57-N | 4.25 | 4.25 |
| Elvax 250 | 2.29 | 2.29 |
| Calcium Carbonate | 40.13 | 40.13 |
| Glass Fiber | 8.03 | 8.03 |
|  | 100.00 | 100 |

M.P. 170° F.
Flash and Fire point, none to 600° F.; specific gravity 1.85 (.066 lb./in.).

EXAMPLE VIII

|  | Parts by weight | Percent by weight |
|---|---|---|
| Carnauba Wax | 15.00 | 5.50 |
| Aroclor 5460 | 90.00 | 34.00 |
| T-57-N | 10.00 | 3.70 |
| Calcium Carbonate | 108.00 | 40.00 |
| Glass Fiber | 55.00 | 16.80 |
|  | 278.00 | 100 |

EXAMPLE IX

In the compound of Example I, the carnauba wax was replaced with ouricury wax with good results.

EXAMPLE X

In the compound of Example I, the carnauba wax was replaced with candelilla wax. In this case the melting point dropped from 168–70° F. to 154° F. so that if the heat generated due to the machinery operation raises too high, there will tend to be a soft, stickier chip.

"Aroclor 5460" is a chlorinated diphenyl made by Monsanto Chemical Co. and has the following properties:

| | |
|---|---|
| Acidity—Maximum (mgm. KOH per gm.) | 0.07 |
| Average coefficient of expansion (25°–124° C.) | 0.00179 |
| Density: | |
|    Specific gravity 25°/25° C. | 1.670 |
|    Pounds per gallon | 13.91 |
| Flash point and fire point | None |
| Softening point ASTME-28 ° C | 100–105.5 |
| Refractive index | 1.660–1.665 |

"Elvax 250" is a high molecular weight ethylene vinyl acetate copolymer sold by Du Pont, "Elvax" being a trademark of Du Pont. It has the following general properties:

| | |
|---|---|
| Inherent viscosity @ 30° C. (0.25 g./100 ml. toluene) | 0.85 |
| Density, g./cc. @ 23° C. | 0.951 |
| Refractive index | 1.485 |
| Tensile strength, p.s.i. | 2.000 |
| Elongation @ break, percent (ASTM D882) | 750 |
| Elastic (tensile) modulus | 1475 |
| Hardness, Shore A 2 Durometer | 72 |
| Softening point, ring and ball (ASTM E28) | 280 |
| Cloud point in paraffin wax, ° F. | 150 |

"T-57-N" is a hydrogenated glyceride sold by Archer Daniels Midland Company, Cleveland, Ohio and has the following general properties:

| | |
|---|---|
| Melting point ° C | 59–61 |
| Acid number max | 1 |
| Saponification value | 193–198 |
| Iodine value max | 1 |
| Specific gravity @ 100/20° C. | 0.8450 |
| Color 5¼" Lovibond max | 15Y/R |
| Chain length acids: | |
|    $C_{14}$ percent | 0.2 |
|    $C_{16}$ do | 28.6 |
|    $C_{18}$ do | 71.2 |
|    Unsaturated do | 1.0 |
|    Saturated do | 99.0 |

The preferred waxes are carnauba and ouricury. It has been found that the addition of the vinyl resin "Elvax 250" is particularly efficacious in providing a compound for use in machining operations.

It should be apparent that details of the compounds may be changed without departing from the spirit of the invention except as defined in the appended claims.

What is claimed is:

1. A composition consisting essentially of between 4.8% and 6.3% by weight of natural wax selected from the group consisting of carnauba wax, ouricury wax and candelilla wax; 2.2% to 4.7% by weight of high molecular weight ethylene vinyl acetate copolymer; 2.2% to 4.7% by weight of hydrogenated glyceride; 29% to 39% by weight of chlorinated diphenyl; and the remainder of filler material.

2. A composition according to claim 1 wherein the filler material is 39 to 40% of calcium carbonate; and 8 to 19% glass fiber.

3. A composition consisting essentially of 6.4% by weight of carnauba wax; 4.30% by weight of hydrogenated glyceride; 2.3% of high molecular weight ethylene vinyl acetate copolymer; 39% by weight of chlorinated diphenyl; 40% by weight of calcium carbonate; and 8% by weight of glass fiber.

4. A composition according to claim 1 wherein the filler material includes aluminum powder and aluminum flake.

References Cited

UNITED STATES PATENTS

| | | |
|---|---|---|
| 3,232,895 | 1/1966 | Klein. |
| 3,025,167 | 3/1962 | Butler. |
| 3,207,716 | 8/1965 | Lippoldt. |

JULIUS FROME, *Primary Examiner.*